United States Patent

[11] 3,567,056

| [72] | Inventor | Marvin S. Mason<br>106 S. E. 11th St., Aledo, Ill. 61231 |
|---|---|---|
| [21] | Appl. No. | 792,417 |
| [22] | Filed | Jan. 21, 1969 |
| [45] | Patented | Mar. 2, 1971 |

[54] MATERIAL HANDLING APPARATUS
5 Claims, 8 Drawing Figs.

[52] U.S. Cl. ................................................. 214/771
[51] Int. Cl. ................................................. B66f 9/12
[50] Field of Search ...................................... 214/145,
140, 778, 779, 773, 775, 776, 131, 141, 771

[56] References Cited
UNITED STATES PATENTS

| 2,876,921 | 3/1959 | Salna | 214/776X |
| 3,065,556 | 11/1962 | Kampert | 214/145X |
| 3,207,338 | 9/1965 | Felburn | 214/131 |
| 3,223,262 | 12/1965 | Orwig | 214/776X |
| 3,261,485 | 7/1966 | Anderson | 214/141 |
| 3,384,256 | 5/1968 | Ulaky | 214/778 |

*Primary Examiner*—Albert L. Makay
*Attorney*—Davis, Lucas, Brewer and Brugman

ABSTRACT: Power actuated material handling, engaging and loading apparatus, detachably mounted over the rear chassis portions of a semitrailer truck tractor, without interfering with normal trailer hauling operations of the tractor but, capable of actuation to convert the tractor to a mobile crane and lift truck whereby load engaging means move with one end of a pivotally movable mast assembly to provide convenient means for loading and unloading materials hauled by the trailer.

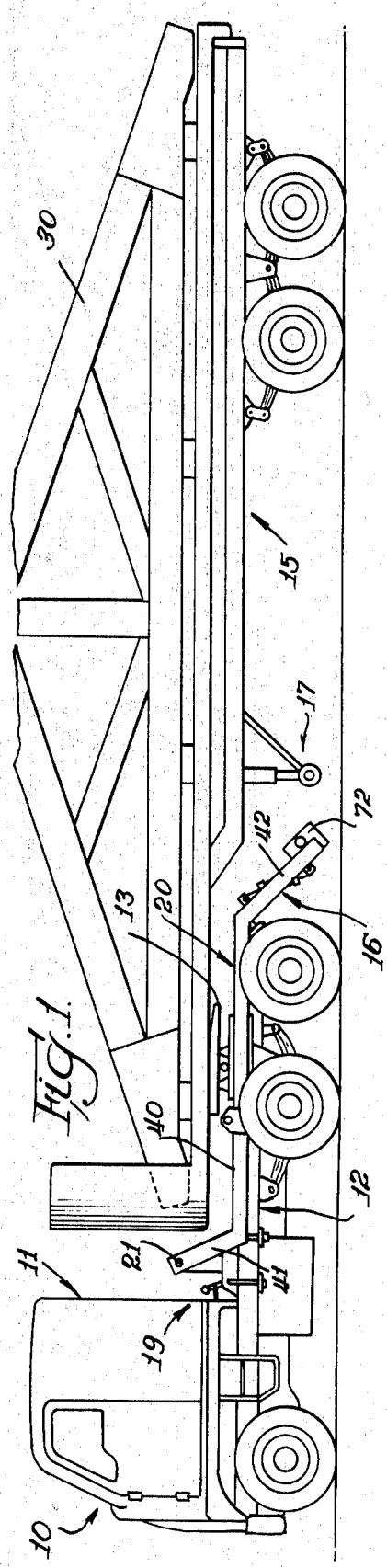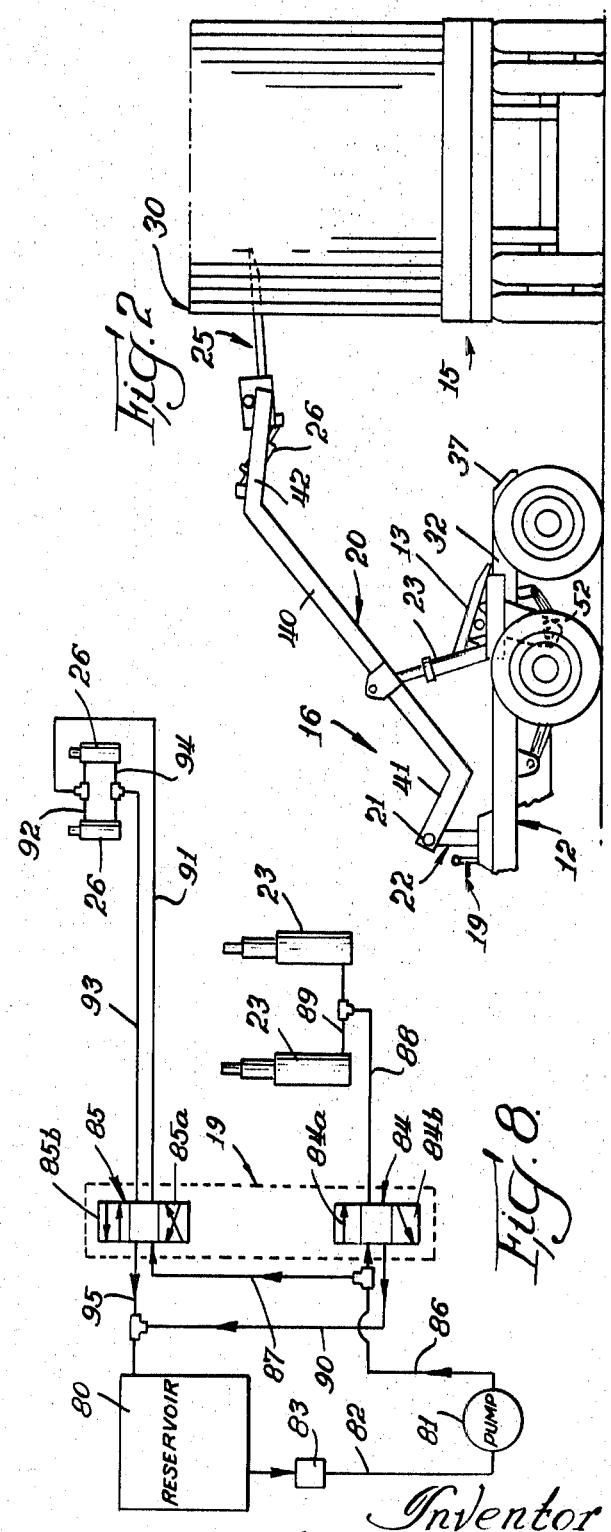

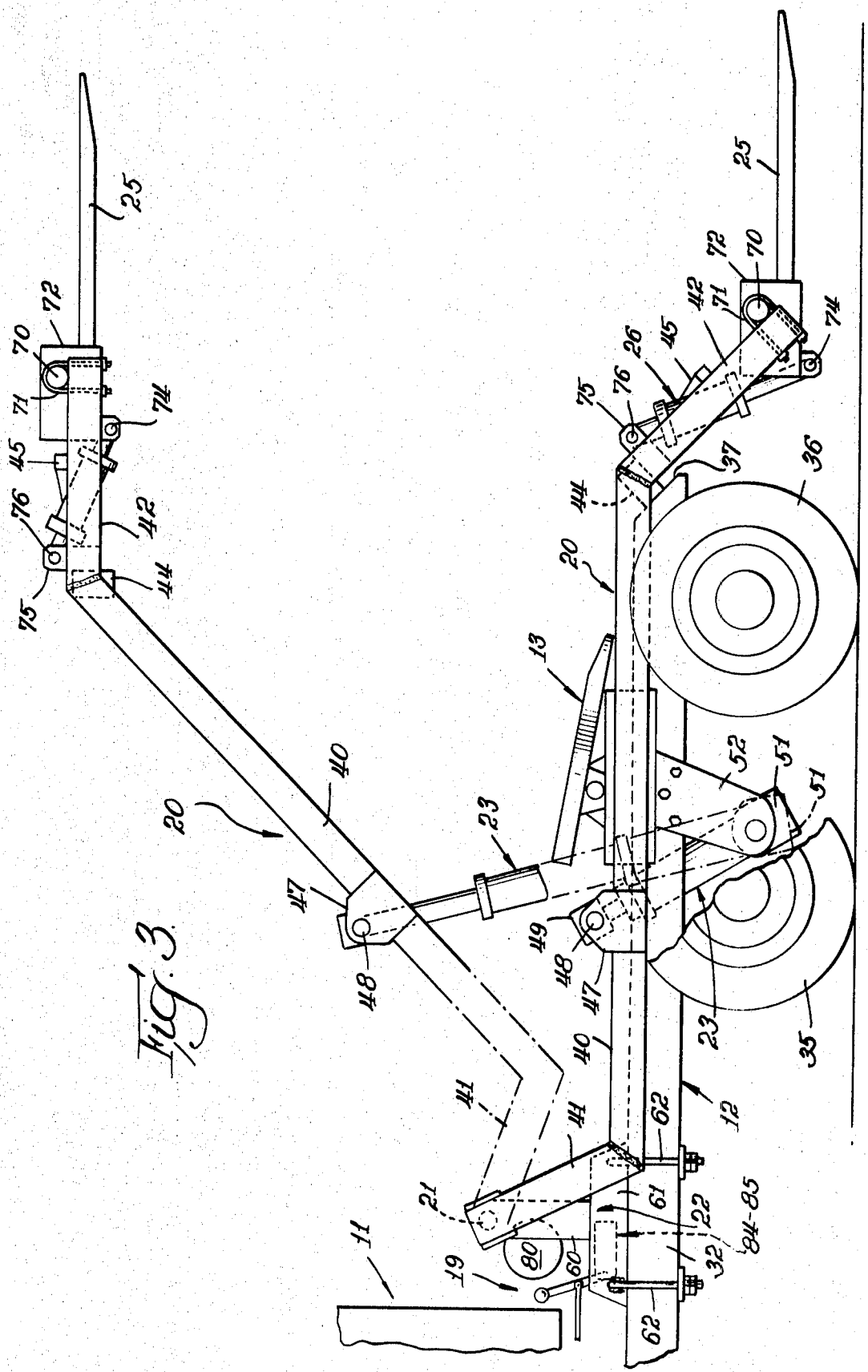

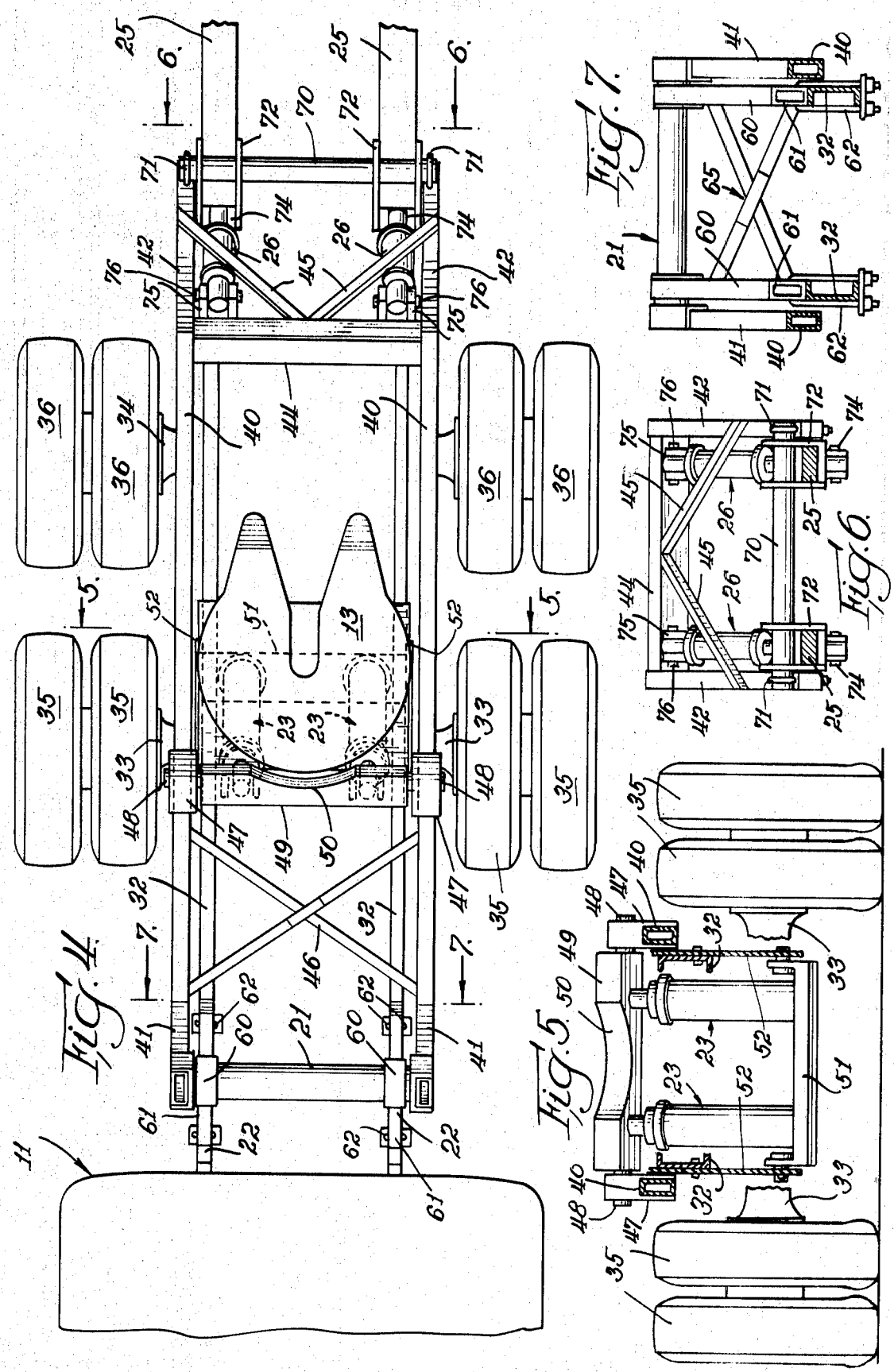

MATERIAL HANDLING APPARATUS

This invention relates generally to material handling equipment, and more particularly to improved and simplified mast structures for motivating load engaging means generally vertically about a fixed pivot means carried by a mobile vehicle.

In our present-day economy, the use of tractor drawn semitrailers for highway transporting of materials is a familiar sight. This mode of transportation is particularly effective for moving bulky materials such as, prefabricated structures and raw building materials, to remote construction sites. While such equipment generally is efficient and economical, one of the major problems encountered in its use lies in providing adequate means for unloading such trailer loads, particularly at remote sites. While conventional lift truck means, cranes or the like are readily available at the normal loading points, such as material handling yards, remote construction sites do not readily lend themselves to providing such equipment. It therefore has become increasingly desirable to provide some type of mobile equipment or apparatus, preferably capable of being transported with the trailer or truck tractor, whereby trailer loads may be easily loaded and unloaded.

In recognition of this need the prior art has developed devices of the general character referred to hereinabove, typified, for example, by U.S. Pat. No. 3,261,485 issued to Anderson, on Jul. 19, 1966, or that to Felburn U.S. Pat. No. 3,207,338 issued Sept. 21, 1965. This invention is directed to apparatus generally similar to that set out in these referred to patents and others, but with marked improvement, simplification, and advantage thereover.

In brief, the present invention comprises an improved structural combination for a crane comprising novel mast means movable about a fixed axis for elevating and lowering load engaging means mounted at one end thereof. The novel mast assembly permits the load engaging means to move generally vertically without interfering with them the mobile carrier on which it is mounted and while avoiding the need for an extensible multipart mast system. The preferred embodiment of this invention as herein disclosed, is adapted to a truck tractor chassis and is configured for operation and storage over the rear end portions thereof.

It is an important object of this invention to provide improved apparatus for converting a truck tractor into a material handling lift truck.

Another important object of this invention is to provide improved material handling equipment having unique, nonextensible mast means pivotable about a single axis and capable of lifting loads substantially vertically.

Still another important object of this invention is to provide improved detachably mountable material handling apparatus for converting a truck tractor to combination fork lift and crane operations.

A still additional object of this invention is to provide a material handling device for a mobile truck tractor demonstrative of simplified construction, installation, economy of manufacture, and dependability of operation.

Having thus described the present invention, the above and further objects, features and advantages thereof will be recognized by those skilled in the art from the following description of a preferred embodiment thereof, illustrated in the accompanying drawings.

IN THE DRAWINGS

FIG. 1 is a side elevational showing of a typical tractor drawn trailer unit equipped with apparatus according to this invention;

FIG. 2 is a partial view in side elevation, illustrating the material handling apparatus of FIG. 1 in operation;

FIG. 3 is an enlarged partial side elevational view of the rearward portions of the truck tractor seen in FIGS. 1 and 2 and illustrating the raised and lowered positions of apparatus according to this invention;

FIG. 4 is a top plan view of the apparatus illustrated in FIG. 3;

FIG. 5 is a cross-sectional view taken substantially along vantage line 5-5 of FIG. 4 and looking in the direction of the arrows thereon;

FIG. 6 is a cross-sectional view looking at the right hand end of the truck chassis as seen in FIG. 4, looking substantially along vantage line 6-6 in that FIG.;

FIG. 7 is a cross-sectional view taken substantially along vantage line 7-7 of FIG. 4 and looking in the direction of the arrows thereon; and FIG. 8 is a schematic diagram of a hydraulic circuitry and system useful in actuating apparatus according to this invention.

Turning now to the features of the preferred embodiment as illustrated in the accompanying drawings, initial reference is made to FIGS. 1 and 2 which illustrate the general features and context in which the apparatus of the present invention is related for purposes of the present disclosure.

As shown in FIG. 1, a mobile truck tractor 10 is equipped with the usual cab 11 mounted over the forward end of a chassis frame 12 in a conventional manner. A fifth wheel 13 is carried by the chassis frame 12 for coupling the tractor to a semitrailer 15. Mounted over the rear portions of the chassis frame is material handling apparatus 16 according to this invention; the same being shown in FIG. 1 in a retracted or stored condition whereat the same avoids interference with the normal operations of the truck tractor 10 and trailer 15 coupled thereto by the fifth wheel. Apparatus 16 also lies noninterferingly below the level of the fifth wheel 13 and projects rearwardly beyond the chassis frame a short distance without interfering with the parking gear 17 associated with the trailer. Suitable control means 19 are provided adjacent the rear of the truck cab 11 and also inside the cab for power actuating the apparatus, as will be described in greater particular hereinafter.

With reference to FIG. 2 of the drawings, it will be seen that apparatus 16 as therein illustrated comprises a pivotal mast assembly 20 of a substantially Z-shaped configuration in side elevation which is pivoted near one end on a horizontal axle or shaft 21 carried at the upper end of pivot support means 22 detachably mounted on the chassis frame 12 of the truck. Suitable hydraulic elevating ram means 23 are provided intermediate the ends of the mast assembly 20, being supported on the chassis frame 12 generally over and/or between the rear load supporting axle or axles of the vehicle as the case may be. Hydraulic ram means 23 serve to actuate the mast assembly 20 about the pivot axle 21.

The outer or freely moving end of the assembly 20 is equipped with extending load engaging means comprising a pair of removable fork arms, indicated generally by numeral 25, which are tiltable with respect to the outer ends of the mast assembly and are selectively positioned in accordance with the actuation of hydraulic tilting piston and cylinder assemblies 26 associated therewith. It is to be noted from FIG. 2, that when the assembly 20 is raised with load engaging means 25 extended substantially horizontally as illustrated in this FIG., the apparatus 16 is capable of loading or unloading large roof truss assemblies 30 or similar items from the bed of the trailer 15 without interfering with the truck tractor 10.

Turning now to the particulars of the apparatus 16 in accordance with the illustrated preferred embodiment, reference is made to FIGS. 3-7 of the drawings. As shown best in FIGS. 3 and 4, chassis 12 comprises a pair of elongated parallel channel frame members 32, 32 extending rearwardly from and beneath the cab 11 and which are cross connected by transverse frame members at suitable intervals to form a rigid frame. A pair of tandem axles 33 and 34 are mounted beneath the rear of the chassis 12. Pairs of ground engaging wheels 35 are mounted at opposite ends of axle 33 and, similar ground engaging wheels 36, 36 are mounted on the rearwardmost axle 34. A fifth wheel 13 is located between the parallel frame members 32, 32 generally over axles 33 and 34 and such is adapted to be longitudinally positioned at selected locations therealong, according to recognized practice. The outer or rearwardmost end of the two frame members 32, 32 are suitably chamfered or cut at a downward slope, as at 37, (see FIG. 3) to accommodate clearing the mast assembly 20 in its housed or lowered condition, as will be described in greater detail presently.

As shown best in FIGS. 3 and 4, assembly 20 is generally Z-shaped in side elevation, comprising a pair of parallel spaced and registeringly aligned lift arms, each of which is fabricated of tubular steel channel sections constituting an elongated main body portion 40 having a shorter obliquely related elbow portion 41 welded to the inner end thereof and a similar obliquely related arm portion 42 welded to the outer end thereof. It is to be noted that the extension of portion 41 from the main body portion 40 is in an opposite direction from that of the outer arm portion 42, according to the required Z configuration.

The two lift arms are cross-connected by a transversely related cross frame 44 extending therebetween, substantially opposite the junction of the forwardly extending arm portions 42, 42 and the main body portions 40, 40 thereof. Angle braces 45, 45 (see FIG. 4) also extend from substantially the midpoint of the cross frame 44 to the midpoint of the two arm portions 42, 42. An X-cross brace assembly 46 also is provided near the rearward end of the two main body portions 40, 40 rigidly interconnecting and bracing the same in spaced parallelism.

Located intermediate the ends of the main body portions 40, 40 of the two lift arms are a pair of opposing pivot ears 47, 47 which project from the body portions 40 for receiving coaxially aligned trunnions 48, 48 extending from the outer ends of a central lift yoke member 49 formed, in the particular instance illustrated, with a semicircular cutaway section 50 along one edge for clearing the fifth wheel 13 (see FIGS. 4 and 5). As shown in the latter FIG. in particular, the trunnions 48 extend outwardly from opposite ends of the yoke member 49 through the upstanding ears 47 to effect pivotal attachment between the yoke 49 and the mast assembly. The elevating actuators or piston assemblies 23, 23 extend between the yoke 49 and a horizontally aligned undersupporting cradle member 51 which is pivotally suspended beneath the main frame members of the truck chassis on depending brackets 52, 52 (see FIG. 5) adjacent a single rear axle or between rear axles in a tandem suspension as shown.

The rearwardmost or inner ends of the two lift arms and more particularly the elbow portions 41, 41 thereof are connected to opposite ends of a rigid pivot axle 21 which extends horizontally between a pair of upright and parallel spaced stanchions 60, 60 each having a supporting pedestal 61 comprising support means 22. Tie-down brackets 62, 62 detachably hold each pedestal 61 to one of main frame members 32 of the chassis (see FIG. 3). It will be noted that with this arrangement, the pivot axis defined by axle 21, is located near the upper ends of the stanchions 60, 60 and therefore is elevated above the general plane of the truck chassis. In order to further stabilize and support the two stanchions 60, 60 the same also are cross-connected by an X-brace system 65 (see FIG. 7). Suitable bearings (not shown) are carried in the outer ends of the elbow portions 41, 41 to rotatably receive the ends of pivot axle 21 and accommodate pivoting movements of the mast assembly 20 thereabout.

At the outer or freely movable end of the mast assembly and more particularly mounted between the outer most ends of the two arm portions 42, 42 thereof, is a generally cylindrical rigid cross bar member 70 having its ends clamped in members 71 to secure the same over the upper edges of the two depending arm portions 42, 42. A pair of fork shoes 72, 72 are mounted for rotation about the cross connecting bar member 70; the same being located one adjacent each of the arm portions 42 as best seen in FIG. 4. Tilting cylinder piston actuators 26, 26 extend between the rearward end of each of the fork shoes 72 and the cross connecting member 44 for pivotally actuating the shoes 72 in unison about bar 70. Each of the shoes 72 is U-shaped and presents an open lower pocket receptive of the base end of a removable fork arm 25 whereby the latter are tiltable with respect to the mast assembly with the movements of the shoes 72.

It will be appreciated that each of the hydraulic actuators 26 is pivotally joined at its lower end to a shoe 72 as by pin means 74. The opposite end of each actuator is pivotally connected to one of two anchor brackets 75 by pin means 76; the brackets 75 being fixed to the cross connecting member 44.

As indicated best in FIG. 1 of the drawings, shoes 72 may be rotated substantially parallel to the depending arm portions 42, 42 when the mast assembly is placed in a trailing or storage condition. In such instance, the fork arms 25, 25 preferably are removed from the pockets provided by the shoe members and stored ready for use when needed on location.

With special reference to FIG. 3 and 4 of the drawings it will be seen that when the mast assembly 20 is in a lowered, stored condition, the elongated body portions 40, 40 thereof, lie generally parallel and alongside the two frame members 32 of the truck chassis and laterally beyond the fifth wheel so as to clear the latter upon elevation without interfering with its positioning in any way. Further, it is to be noted that the cross connecting member 44 engages the chamfered or sloping end faces 37 of the chassis members 32 to limit the lowering movements of the assembly 20 (see FIG. 3). In stored position therefore the obliquely related outer arm portions 42, 42 trail beyond the rearward end of the chassis frame members in a downwardly depending fashion as best illustrated in FIG. 3 of the drawings.

Turning now to the features of the hydraulic system for actuating assembly 20, reference is made to FIG. 8. As shown, such system comprises a reservoir means 80 coupled to pump means 81 over conduit 82 containing the usual filter means 83. The discharge side of pump means 81 is connected to control means 19, having a pair of mechanically operated control valve sections 84 and 85, via conduit 86. Branch conduit 87 cross connects such valve sections. Valve section 84 serves to control actuation of the telescoping lift cylinders 23, 23; being coupled thereto by conduit 88 which simultaneously feeds hydraulic fluid to both actuators 23 over a cross connecting conduit 89. In the normal lifting operation, valve means 84 is conditioned to supply pressurized fluid to conduit 86 through valve section 84a and conduits 88 and 89 to raise or extend the pistons within the actuators 23. To reverse or lower the actuators 23, valve section 84a is closed and valve section 84b opened, permitting return flow of hydraulic fluid through return conduits 89, 88 and 90 to reservoir 80.

To actuate the tilting piston cylinders 26, associated with the fork arms 25, pressurized fluid is supplied over conduit 86 and branch conduit 87 to the inlet side of valve 85 and more particularly to section 85a thereof positioned to supply pressurized fluid to the upper side of the pistons within the actuators 26, 26 over supply conduit 91 and branch 92. Correspondingly valve section 85b is operable to supply fluid to the bottom of the pistons over conduits 93 and branch 94. Return flow to reservoir 80 from valve 85 is via conduit 95. With this arrangement when valve section 85a is conditioned to supply conduit 91, section 85b is conditioned to permit return flow over conduits 93 and 95 to reservoir 80. In such a condition of operation, the pistons in the actuators 26 will be retracted in accordance with a supply of fluid to the upper ends thereof. On the other hand, if it is desired to extend the pistons, then valve section 85b is opened to supply fluid over conduits 93 and 94 to the bottom ends of the pistons with return flow of the pressurized fluid taking place over conduits 91 and 95 to reservoir 80.

It will be appreciated, of course, that the above described hydraulic circuitry may be varied widely in accordance with known practice in the art. However, the simplified arrangement illustrated in which full control is limited to a pair of valves of the control means 19 and four hydraulic actuators 23, 23, 26, 26 is believed to be an improve simplification over hydraulic actuators employed heretofore in this art.

Having thus described the structural features of this invention, reference is now made to FIGS. 2 and 3 of the drawings in particular, to illustrate the operational advantages and aspects thereof. As shown best in FIG. 3, with the mast assembly 20 in its lowered condition, the load engaging means or fork arms 25 are disposed just above ground level to the rear of the truck chassis. Actuators 26 are shown extended to dispose the fork arms horizontal to engage a load.

Importantly, when the mast assembly 20 is raised to its fully extended or uppermost position as indicated in the upper part of FIG. 3, it is to be noted that the fork arms 25, 25, are positioned outwardly or beyond the rear end of the truck chassis and rear wheels 36 so that there is no particular interference between a load on the fork arms 25 and the frame of the vehicle to which the apparatus is attached. This novel feature is due in part to the elevated location of the pivotal axis, defined by the horizontal axle 21, coupled with the compound, generally Z-shaped formation of the arms of the mast assembly. As shown, raising pivotal movement of the mast about axle 21 produces an effective advancing movement of the elbow portions 41 about axle 21, thus moving body portions 40 and arm portions 42, 42 carrying the fork arms 25, 25 away from the pivot axis of the mast assembly. Such advancing movement is determined by the angular offset and extent of the elbow portions of 41, 41 which lie between the elevated pivot center of axle 21 and the elongated main body portions 40, 40. By this expedient, it is unnecessary to provide any means, such as compound extensible mast, in order to maintain a load on arms 25 rearwardly of the vehicle. In effect the mast assembly of this invention produces a nearly vertical or upward translation of the load engaging means 25, despite the rigid nonextensible construction of the mast and its movement arcuately about a single fixed pivot axis.

From the foregoing it is believed that those familiar with the art will readily recognize and appreciate the improved advancement of this invention over previously known devices of this character. Further, while this invention has been described as it appears in a particular preferred embodiment comprising an attachment to be coupled to the chassis of a semitrailer tractor truck, it is to be appreciated that its uses are by no means so limited since its application and teachings are equally advantageous with other classes of vehicles, such as crawler tractors, front end loaders and the like.

I claim:

1. A lift-loading attachment for an over the road semitrailer truck having a chassis frame, comprising parallel spaced longitudinal frame members, carrying a fifth wheel adjacent the rear end thereof for coupling a trailer thereto and an operator's cab adjacent the front end thereof and undersupported by ground engaging wheels mounted on longitudinally spaced front and rear axles comprising: a rigid nonextensible mast assembly mounted on the rearward portions of the chassis frame and comprising a pair of parallel spaced, registeringly aligned and rigidly interconnected lift arms each of unitary angulated configuration substantially Z-shaped in side elevation, each comprising an elongated main body portion, an obliquely related shorter elbow portion extending angularly upwardly from the inner end of said body portion, and an obliquely related, short arm portion extending angularly downwardly from the outer end thereof; said lift arms being disposed for movement in parallel vertical planes located laterally outwardly of said chassis frame members and beyond the diametrical limits of said fifth wheel, with said arm portions thereof depending downwardly past the rear end of said chassis frame in the lowered position of said mast assembly and said elbow portions thereof extending obliquely above the plane of said chassis frame toward the cab thereon at a location between the latter and said fifth wheel; support means mounted on said chassis frame comprising parallel spaced stanchions extending vertically upwardly between the innermost ends of said elbow portions and including axle means extending horizontally between and pivotally connected to said innermost ends to define a horizontal pivotal axis for said mast which is elevated substantially above the plane of said chassis frame; load engaging means pivotally mounted between the outer ends of said arm portions, and power actuated means selectively operable to pivotally tilt said load engaging means relative to said mast lift arms and to elevate and lower the latter about said pivotal axis; the angulated disposition and reach of said elbow and arm portions rearwardly away from said pivotal axis being such as to maintain said load engaging means beyond the rear end of said chassis frame throughout the raising and lowering movements of said mast assembly.

2. The combination of claim 1, wherein said power actuated means comprises extensible ram means subtending between said frame members and connected at its upper end to a rigid yoke member pivotally connected to and extending between the body portions of said mast assembly at points thereon located between said pivotal axis and said fifth wheel.

3. The combination of claim 1, wherein said power actuated means comprises hydraulic ram means for elevating and lowering said mast assembly about said pivotal axis, said ram means underengaging a yoke member extending transversely between and pivotally coupled at its ends to said body portions intermediate the ends of the latter, said ram means also being pivotally coupled to undersupporting means therefor located beneath the chassis frame whereby said ram means is pivotally movable relative to both said mast assembly and undersupporting means during pivotal movements of said mast assembly; the angulated disposition and reach of said elbow portions effecting longitudinal translating movement of said body portions relative to said fifth wheel and toward said pivotal axis during lowering movements thereof to thereby move said yoke member and ram means noninterferingly past said fifth wheel and dispose the same between said cab and said fifth wheel, below the trailer engaging surface of the latter, in the lowered position of the mast assembly.

4. The combination of claim 1, and rigid cross connecting means extending between said elbow portions and the said arm portions of the mast assembly; the cross connecting means between said arm portions being engageable with rearward most ends of the frame members to effectively limit the lowering movements of the mast assembly.

5. The combination of claim 1, wherein said support means is detachably coupled to the chassis frame members whereby the lift-loading attachment is selectively removable from the chassis frame.